United States Patent
Kajarekar et al.

(10) Patent No.: US 9,282,284 B2
(45) Date of Patent: Mar. 8, 2016

(54) METHOD AND SYSTEM FOR FACIAL RECOGNITION FOR A VIDEOCONFERENCE

(71) Applicant: Cisco Technology, Inc., San Jose, CA (US)

(72) Inventors: Sachin S. Kajarekar, Sunnyvale, CA (US); Mainak Sen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 13/897,476

(22) Filed: May 20, 2013

(65) Prior Publication Data

US 2014/0340467 A1     Nov. 20, 2014

(51) Int. Cl.
    *H04N 7/14*        (2006.01)
    *H04N 7/15*        (2006.01)
    *G06K 9/00*        (2006.01)

(52) U.S. Cl.
    CPC .............. *H04N 7/15* (2013.01); *G06K 9/00288* (2013.01)

(58) Field of Classification Search
    USPC ....................................................... 348/14.08
    See application file for complete search history.

(56) References Cited

U.S. PATENT DOCUMENTS

| | | | |
|---|---|---|---|
| 6,611,803 B1* | 8/2003 | Furuyama et al. | 704/254 |
| 7,386,448 B1* | 6/2008 | Poss et al. | 704/247 |
| 7,885,436 B2* | 2/2011 | Russo et al. | 382/124 |
| 8,014,716 B2* | 9/2011 | Ando et al. | 434/350 |
| 8,620,726 B2* | 12/2013 | Nielsen et al. | 705/7.38 |
| 2002/0103649 A1* | 8/2002 | Basson et al. | 704/270 |
| 2006/0259755 A1* | 11/2006 | Kenoyer | 713/1 |
| 2007/0201731 A1* | 8/2007 | Fedorovskaya et al. | 382/118 |
| 2010/0149305 A1* | 6/2010 | Catchpole et al. | 348/14.08 |
| 2010/0271456 A1* | 10/2010 | Tsumura et al. | 348/14.08 |
| 2011/0188713 A1* | 8/2011 | Chin et al. | 382/118 |
| 2011/0255802 A1* | 10/2011 | Kameyama et al. | 382/278 |
| 2013/0057642 A1* | 3/2013 | Catchpole | 348/14.08 |
| 2013/0128070 A1* | 5/2013 | Ishikawa | 348/222.1 |
| 2013/0162752 A1* | 6/2013 | Herz et al. | 348/14.08 |
| 2014/0157145 A1* | 6/2014 | Bush et al. | 715/745 |

* cited by examiner

*Primary Examiner* — Joseph J Nguyen

(74) *Attorney, Agent, or Firm* — Merchant & Gould P.C.

(57) ABSTRACT

Videoconferencing may be provided. A participant may be identified from audio information and in video information. From the video information, a plurality of images may be captured of the participant identified in the video information. A unique identifier may be associated with the captured plurality of images. The unique identifier may correspond to the participant identified from the audio information. The captured plurality of images and the associated unique identifier may be saved in a database.

23 Claims, 15 Drawing Sheets

METHOD AND SYSTEM FOR FACIAL RECOGNITION FOR A VIDEOCONFERENCE

TECHNICAL FIELD

The present disclosure relates generally to video conferencing.

BACKGROUND

Videoconferencing may be used to allow two or more participants at remote locations to communicate using both video and audio. Each participant location may include a videoconferencing system for video/audio communication with other participants. Each videoconferencing system may include a camera and microphone to collect video and audio from a first or local participant to send to another (remote) participant. Each videoconferencing system may also include a display and speaker to reproduce video and audio received from a remote participant. Each videoconferencing system may also have a computer system to allow additional functionality into the videoconference. For example, additional functionality may include data conferencing (including displaying and/or modifying a document for both participants during the conference).

BRIEF DESCRIPTION OF DRAWINGS

The accompanying drawings, which are incorporated in and constitute a part of this disclosure, illustrate various embodiments of the present disclosure. In the drawings.

DESCRIPTION OF EXAMPLE EMBODIMENTS

Overview

Videoconferencing may be provided. A participant may be identified from audio information and in video information. From the video information, a plurality of images may be captured of the participant identified in the video information. A unique identifier may be associated with the captured plurality of images. The unique identifier may correspond to the participant identified from the audio information. The captured plurality of images and the associated unique identifier may be saved in a database.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

Methods and systems for videoconferencing are provided. Audio information and video information may be segregated from videoconference data received at a first endpoint in the videoconference. The segregated audio information may be processed to identify an active speaker. The active speaker in the audio information may be identified by performing speaker segmentation and recognition (SSR) algorithm on the audio information. An active speaker in the video information may be identified by performing an active speaker detection (ASD) algorithm on the video information. The output from analysis on the audio information and the video information may be compared. Based on the comparison an active participant may be identified. A face database and a speaker database may be updated to include facial images and voice model for the active participant.

Figure 1:
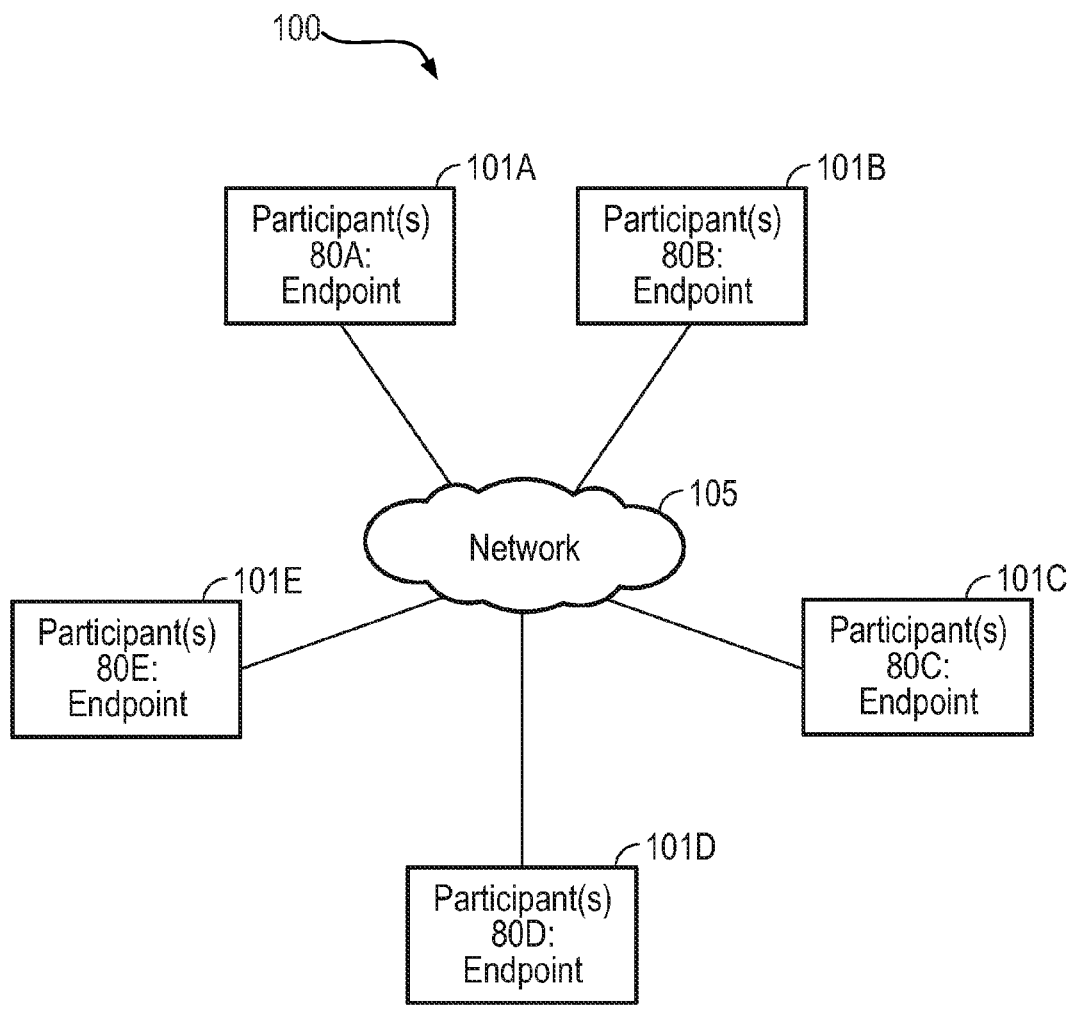
FIG. 1 is a diagram illustrating a videoconferencing system 100.

FIG. 1 is a diagram illustrating a videoconference system 100. Videoconference may comprise a conference between participants at two or more locations with video information sent from at least one of the locations to one or more of the other locations. For example, the video information sent from a given location may represent a live video stream (e.g., a video signal) received from a camera or other video source, where the video information is received by the other locations and used to reproduce the live video stream on a display device, such as a television or computer monitor. In addition to video information, audio information may also be sent from at least one of the locations to one or more of the other locations.

Videoconferencing systems may allow people at two or more different locations to participate in a conference so that the people at each location may see and hear the people at the other location(s). Videoconferencing system 100 may perform digital compression of audio and video signals in real time.

The hardware or software that performs compression may comprise a codec (coder/decoder).

The resulting digital stream of bits representing the audio and video data may be subdivided into packets that may be transmitted through a network (e.g., an integrated services digital network (ISDN) or using Internet Protocol (IP)) to the other locations or endpoints participating in the videoconference.

Videoconferences may be performed, for example, using videoconferencing equipment that may be especially designed for the videoconference. In some embodiments, the videoconferencing equipment may be incorporated into other devices (e.g., a general purpose personal computer (PC)).

For example, a typical desktop PC may be configured to add-on hardware boards and/or software to enable the PC to participate in a videoconference.

The videoconferencing device may include input ports for receiving video signals from local video sources and audio signals from local microphones. The videoconferencing device may also include network ports for receiving the remote audio/video streams from and sending the local audio/video stream to the remote endpoints.

Specialized software and hardware may also be used for compressing and decompressing audiovisual data, generating a composite image of the video streams from the various participants, etc. In addition, the videoconferencing device may include an interface to allow users to interact with the video-conferencing equipment, e.g., to pan, tilt, and zoom cameras, select a video input source to send to the remote endpoints, control volume levels, control placement of video windows on the display device, etc.

Various standards may be used to enable the videoconferencing devices at each endpoint to communicate with each other.

For example, the International Telecommunications Union (ITU) has specified various videoconferencing standards. These standards may include: i) H.320; ii) H.323; and iii) H.324.

H.320 may be used for public switched telephone networks (PSTN) or videoconferencing over ISDN basic rate interface (BRI) or primary rate interface (PRI). H.320 may also be used on dedicated networks such as T1 and satellite-based networks. H.323 may be used for video over Internet Protocol (IP). This standard may also be used for voice over IP (VoIP). H.324 may be used for transmission over POTS (Plain Old Telephone Service), or audio telephony networks.

In some embodiments, IP-based videoconferencing may be used as a communications interface and standard for videoconferencing equipment.

The Internet, and especially broadband, may facilitate the use of H.323 IP-based videoconferencing. H.323 may be accessible to users over a high speed Internet connection, such as a Digital Subscriber Line (DSL) connection, cable modem connection, or other high speed connection.

The various locations of the videoconference participants may comprise endpoints in the videoconference. For example, FIG. 1 illustrates videoconferencing system 100 in which participants 80A, 80B, 80C, 80D, and 80E may be located at respective endpoints 101A, 101B, 101C, 101D, and 101E. A remote endpoint may be relative to a given endpoint in system 100 and may refer to the other endpoints in the system 100. For example, endpoints 101B through 101E may be remote endpoints with respect to endpoint 101A, while endpoints 101A through 101D may be remote endpoints with respect to endpoint 101E.

Although there are five endpoints in system 100, any number of endpoints may be used. The participants at a given endpoint may include various numbers of people. In some embodiments, each endpoint may include at least one person as a participant. In some embodiments, one or more of the endpoints may not have people present as participants. For example, video information from a camera stationed at an endpoint with no participants may be sent to other endpoints and viewed by participants at the other endpoints.

In some embodiments, the endpoints 101 may send video information to all of the remote endpoints 101. In some embodiments, one or more of the endpoints may send video information to only a subset, but not all, of the remote endpoints. Endpoints 101B through 101E may each send video information only to endpoint 101A, and endpoint 101A may send video information to each of the endpoints 101B through 101E. Furthermore, each endpoint 101 may send video information to a Multipoint Control Unit (MCU). The MCU may relay the received video information to the various endpoints 101. The MCU may be located at one of the endpoints 101 or may be in a separate location from the endpoints 101.

One or more of the endpoints 101 may not send video information to a remote endpoint. For example, a given endpoint 101 may receive video information from one or more of the remote endpoints, but may not send video information to a remote endpoint. In some embodiments, a given endpoint 101 may not send video information to a remote endpoint or receive video information from a remote endpoint. For example, the given endpoint 101 may participate in the videoconference by sharing audio information only, e.g., may receive audio information from one or more of the remote endpoints, as well as possibly sending audio information to one or more of the remote endpoints.

As referenced above, in addition to sharing video information, the endpoints 101 may also share audio information. In some embodiments, each endpoint 101 that sends video information to one or more remote endpoints may also send audio information to the one or more remote endpoints 101. Each endpoint 101 may receive both video information and audio information from the other endpoints 101. Moreover, one or more of the endpoints 101 may send video information to one or more remote endpoints, but without sending audio information to the one or more remote endpoints. In some embodiments, one or more of the endpoints 101 may send audio information to one or more remote endpoints, but without sending video information to the one or more remote endpoints.

As referenced above, a Multipoint Control Unit (MCU) may be used to facilitate sharing video and audio information among the endpoints 101. The MCU may act as a bridge that interconnects calls from several endpoints.

For example, endpoints 101 may call the MCU, or the MCU may call endpoints 101 that are going to participate in the videoconference. The MCU may be located at one of the endpoints 101 of the videoconference or may be in a separate location from an endpoint 101. In some embodiments, the MCU may be embedded in a videoconferencing device at one of the endpoints 101.

Endpoints 101 may be coupled to each other through a network 105 and may exchange data with each other via network 105. More particularly, videoconferencing devices located at the various endpoints 101 may be coupled to each other through network 105. The videoconferencing devices may communicate with each other through network 105 using various communication protocols. For example, the videoconferencing devices may communicate using an IP-based protocol or other packet-based communication protocol.

Network 105 may include various types of networks or combinations of networks. For example, the network 105 may include various types or combinations of computer networks, data networks, or telephonic networks. Embodiments of computer networks include local area networks (LAN), wide area networks (WAN), an Intranet, the Internet, etc. Local area networks may comprise Ethernet networks, Fiber Distributed Data Interface (FDDI) networks, and token ring networks. Also, the videoconferencing devices may be coupled to network 105 using various types of wired or wireless connection mediums. For example, wired mediums may include Ethernet, fiber channel, ISDN connection, etc. Wireless connection mediums may include a satellite link, a modem link through a cellular service, a wireless link, a wireless connection using a wireless communication protocol such as IEEE 802.11 (wireless Ethernet), etc.

Figure 2:
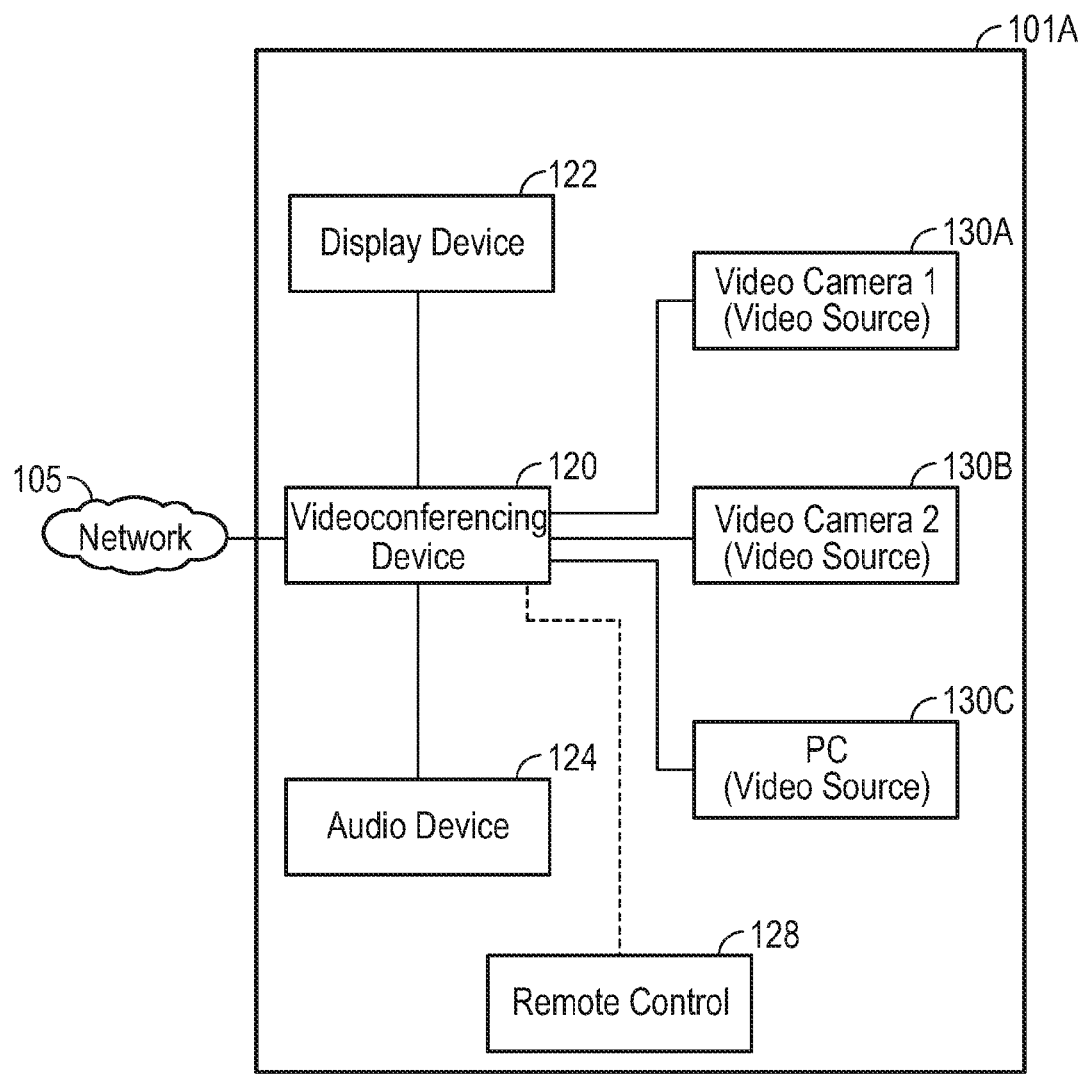
FIG. 2 is a diagram illustrating a videoconferencing system including a video conferencing device.

FIG. 2 illustrates endpoint 101A in more detail. Endpoints 101B through 101E may comprise similar construction. As shown, endpoint 101A may include a videoconferencing device 120. Videoconferencing device 120 may be operable to receive video information from and send video information to remote endpoints in a videoconference (e.g., directly or through an MCU). In addition, videoconferencing device 120 may receive audio information from and send audio information to the remote endpoints.

Videoconferencing device 120 may receive a plurality of video input signals from a plurality of video sources 130, e.g., via inputs on the videoconferencing device 120. In various embodiments, a video source 130 may include various kinds of devices operable to produce a video signal. In some embodiments, the video sources 130 may include two video cameras and a personal computer (PC), e.g., where the PC provides a video signal through a video card. Other video sources 130 may include a Digital Versatile Disc (DVD) player, a Video Cassette Recorder (VCR), or other device operable to produce a video signal. Videoconferencing device 120 may receive respective video input signals from various numbers of video sources 130. Videoconferencing device 120 may be operable to select one (or more) of the video input signals received from video sources 130 as a video input signal to send to one or more of the remote endpoints in the videoconference.

Videoconferencing device 120 may be coupled to network 105. Videoconferencing device 120 may send the selected local video input signal to remote endpoints 101 via network 105. Videoconferencing device 120 may also receive video signals from remote endpoints 101 via network 105. The video signals received from remote endpoints 101 may comprise remote video signals.

Endpoint 101 may also include a display device 122 to which the videoconferencing device 120 provides an output signal via an output port. Display device 122 may comprise various kinds of devices operable to display video information, such as a television, computer monitor, LCD screen, projector, or other device.

Videoconferencing device 120 may be operable to display a graphical user interface (GUI) on display device 122, where the user (e.g., the operator of the videoconferencing device 120) can interact with the GUI to provide input to videoconferencing device 120. For example, the user may operate a remote control device 128 or other input device (such as a keyboard or buttons on the videoconferencing device 120 chassis) to request the videoconferencing device 120 to perform a particular operation. In response, videoconferencing device 120 may display various GUI elements on display device 122.

Videoconferencing device 120 may also couple to an audio device 124. For example, audio device 124 may comprise one or more microphones or other audio input devices for providing local audio input to be sent to remote endpoints 101, as well as one or more speakers or other audio output devices for audibly projecting audio information received from remote endpoints 101.

Figure 3:
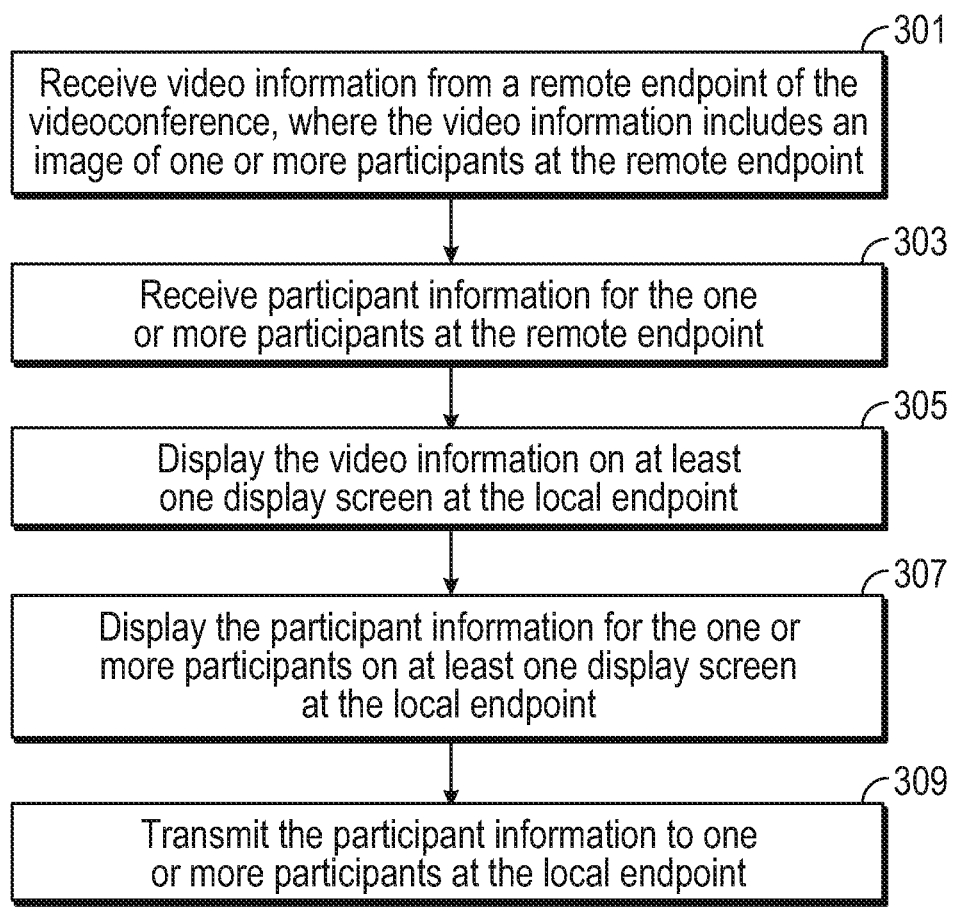
FIG. 3 is a flowchart illustrating a method for displaying participant information for participants in a video conference.

FIG. 3 is a flowchart diagram illustrating a method for displaying and/or sharing participant information for participants in a videoconference. The method of FIG. 3 may be implemented by videoconferencing device 120 (referred to below as the local videoconferencing device) at an endpoint 101 (referred to below as the "local endpoint") in the videoconference.

At block 301, videoconferencing device 120 may receive video information from a remote endpoint of system 100. The video information may include an image of one or more participants at the remote endpoint.

At block 303, videoconferencing device 120, at block 303, may receive participant information for the one or more participants at the remote endpoint. The participant information for each participant may include, for example, distinguishing information associated with the participant, such as a name of the participant, a phone number of the participant, an email address of the participant, a mailing address of the participant, a job title of the participant, an employer of the participant, etc.

Figure 4:
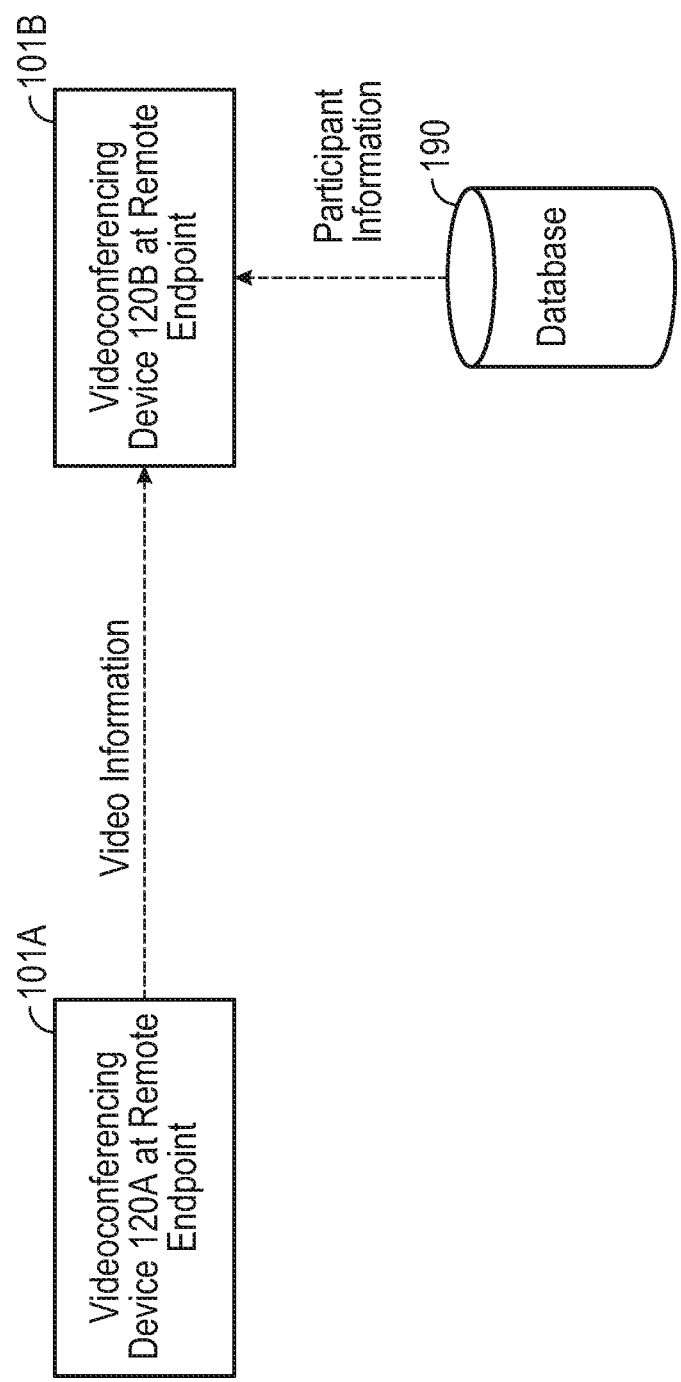
FIG. 4 illustrates receiving participant information from a database.

Videoconferencing device 120 may receive the participant information from a data source. For example, in some embodiments, the local videoconferencing device 120 may communicate with a database to receive the participant information. FIG. 4 illustrates an embodiment in which videoconferencing device 120 receives the video information from a remote videoconferencing device at the remote endpoint and receives the participant information from a database 190. Database 190 may be hosted by a computer server. Database 190 is described in greater detail below.

Videoconferencing device 120, at block 305, may display the video information on at least one display screen at the local endpoint. Displaying the video information may include displaying the images of the one or more participants at the remote endpoint.

Figure 5:
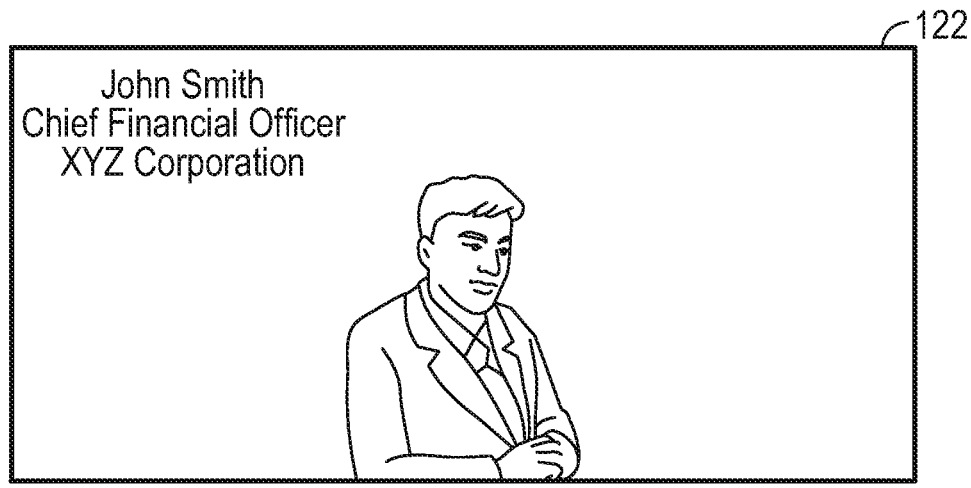
FIG. 5 illustrates an embodiment of an image of a participant displayed together with participant information for the participant.

At block 307, the participant data for the one or more participants may be displayed on at least one display screen at the local endpoint. In some embodiments, the display screen on which the participant information is displayed may be the same display screen as the display screen on which the video information is displayed. For example, FIG. 5 illustrates an embodiment in which an image of a participant at the remote endpoint is displayed on display device 122 at the local endpoint. Participant information for the participant may be displayed together on display device 122 substantially simultaneously with the image of the participant (e.g., the information may appear to be displayed at the same time as the image of the participant). In this embodiment the participant information may include a name of the participant (John Smith), a title of the participant (Chief Financial Officer), and a company with which the participant is associated (XYZ Corporation). In some embodiments, a participant (or other entity) may indicate the extent of the participant information to display. For example, a participant may specify that the extent of the participant information displayed should only include their first and last name.

In some embodiments, the participant may include their job title in the extent of information that can be displayed. In some embodiments, the participant may specific that no information should be displayed for them.

Multiple participants (or a single participant) of the remote endpoint may be displayed on display device 122 at the local endpoint, and participant information for the participant(s) may be displayed together on display device 122 simultaneously with the images of the participant(s). In some embodiments, the participant information for the participants may be displayed proximally to the respective images of the participants to which the participant information corresponds. Displaying the various portions of participant information proximally to the corresponding participants may visually associate the portions of participant information with the respective participants, thus enabling viewers at the local endpoint to ascertain which portions of participant information corresponds to which participants.

Figure 6:
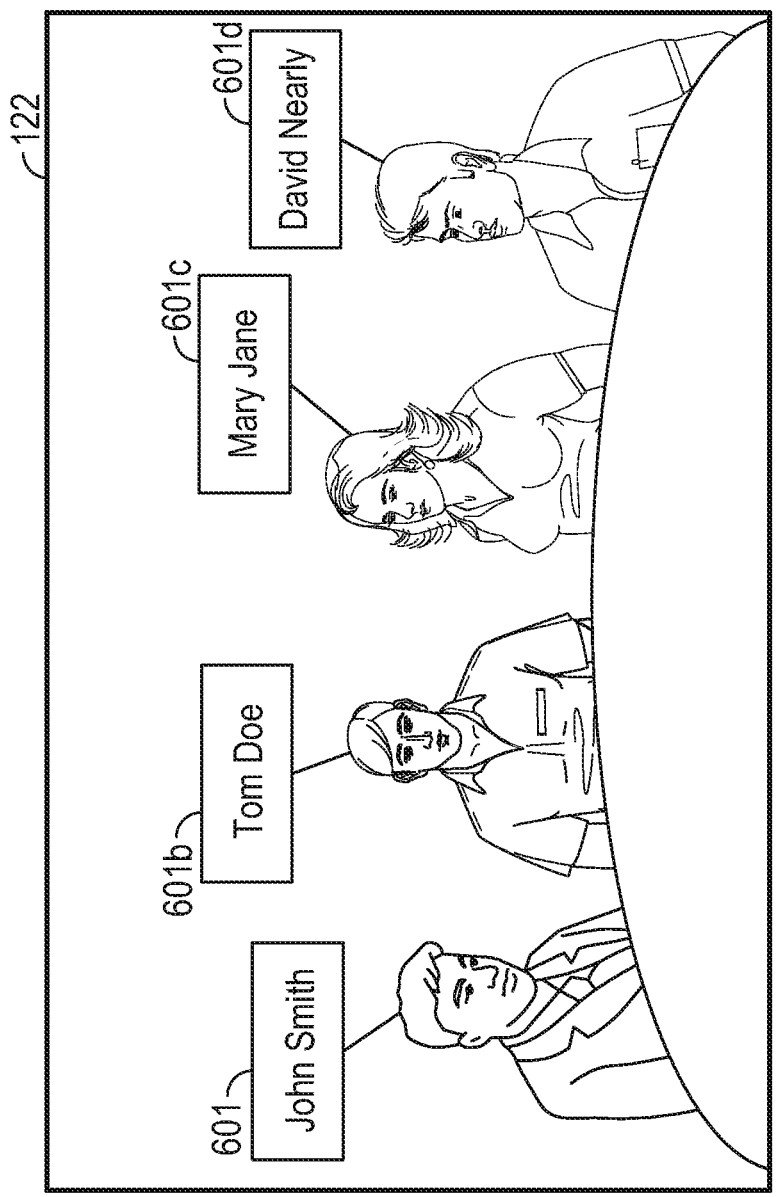
FIG. 6 illustrates a callout box displayed proximally to each participant on a display screen.

The different portions of participant information may be displayed in various ways such that the portions of participant information may be visually associated with their corresponding participants. For example, FIG. 6 illustrates an embodiment in which the local videoconferencing device 120 displays a callout box 601 proximally to each participant. Each callout box 601 may display a name of the respective participant. This may allow the viewers (participants) at the local endpoint to identify the remote participants by looking at the callout boxes 601 displayed proximally to the respective participants.

Figure 7:
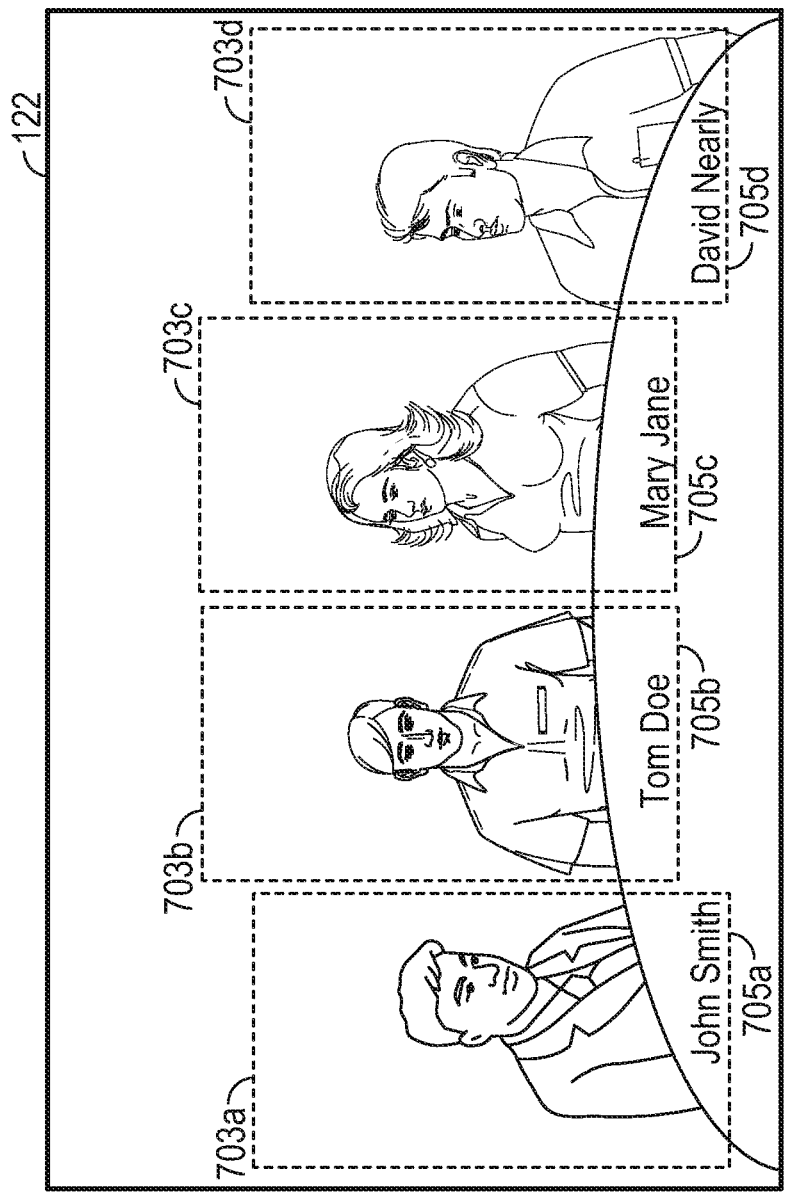
FIG. 7 illustrates multiple portions of participant information displayed simultaneously with images of different participants.

FIG. 7 illustrates an embodiment in which multiple portions of participant information may be displayed simultaneously with images of different participants. In this embodiment, the portions of participant information are visually associated with their corresponding participants by displaying a box 703 around each participant and displaying the name 705 of each participant within each respective box 703.

In some embodiments, multiple remote participants may be displayed simultaneously on display device 122, but participant information may only be displayed for a subset of the participants shown on the display. For example, in some embodiments, videoconferencing device 120 may be operable to analyze the video information to determine which remote participant is currently speaking and may only display participant information for the current speaker. In some embodiments, one of the participants at the local endpoint may move a cursor around the display by operating a mouse or other input device. If the cursor hovers over an image of one of the remote participants, videoconferencing device 120 may display the participant information for that participant in response. Otherwise, participant information may not be displayed for the participants.

The participant information may be displayed on a different display screen than the display screen on which the video information is displayed. For example, the local endpoint may include a main display screen and a supplemental display screen. The main display screen may display the video information received from the remote endpoint, and the participant information may be displayed on the supplemental display screen. In some embodiments, the local participants at the local endpoints may have a small personal display screen located at his seat, which he is able to control. For example, a local participant may operate an input device to provide user input to videoconferencing device 120 to request local videoconferencing device 120 to display the participant information for a certain remote participant on his local display screen.

In addition to or alternatively to displaying the participant information, videoconferencing device 120 may be operable to transmit the participant information for the remote participants to one or more of the local participants at the local endpoint.

For example, videoconferencing device 120 may wirelessly transmit the participant information to a personal wireless device (e.g., a personal digital assistant (PDA), cell phone, laptop with a wireless link, etc.) of a local participant at the local endpoint. This may enable the personal wireless device of the local participant to automatically receive and store contact information or other participant information for the remote participants. In some embodiments, videoconferencing device 120 may send electronic correspondence (e.g., an email) including the participant information for the remote participants to an email address of the local participant.

The participant information received by videoconferencing device 120 in block 303 of FIG. 3 may be retrieved from database 190 in which the participant information was previously stored (e.g., stored prior to or during the videoconference). Database 190 may include a speaker database 806 and a face database 812 as will be described in greater detail below.

Figure 8:
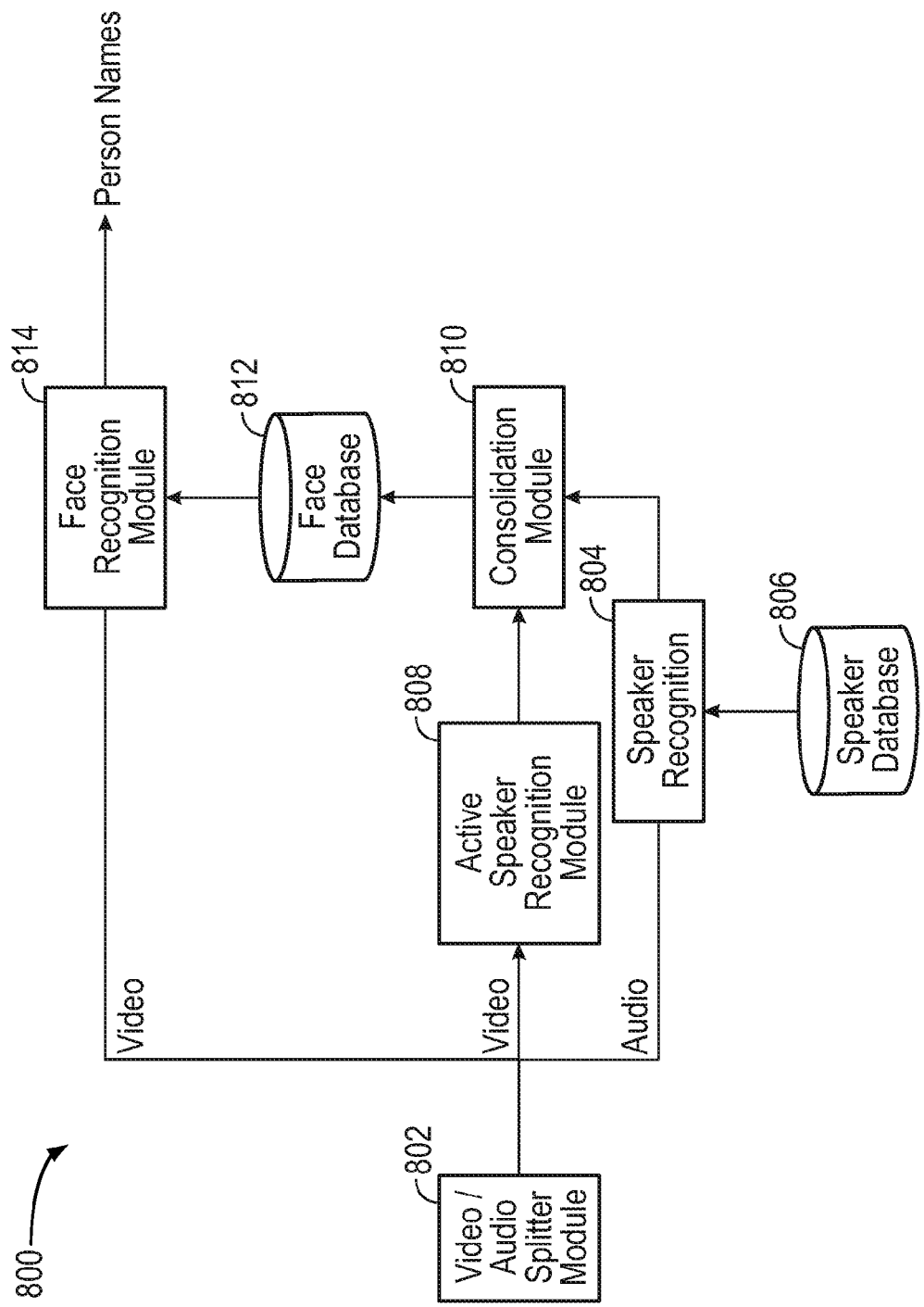
FIG. 8 illustrates a system for creating and updating a database to store participant information.

FIG. 8 illustrates a system 800 for creating and updating database 190. System 800 may include a video/audio splitter module 802, a speaker recognition module 804, a speaker database 806, an active speaker recognition module 808, a consolidation module 810, a face database 812, and a face recognition module 814. Although, speaker database 806 and face database 812 are shown as two separate databases, these two databases may be combined as a single database, such as database 190.

Face database 812 may include records in which facial information, for example comprised in a data object with information (such as a comparative image), describing facial characteristics relevant to a particular participant) for each participant is linked to the participant's participant information. Face database 812 may be a comprehensive face database, and may be used to perform accurate face recognition in light, camera, pose, and expression variations. Speaker database 806 may include records in which audio information, for example comprised in a data object with information (such as a voice models) describing voice characteristics relevant to a particular participant, for each participant is linked to the participant's participant information.

Figure 9:
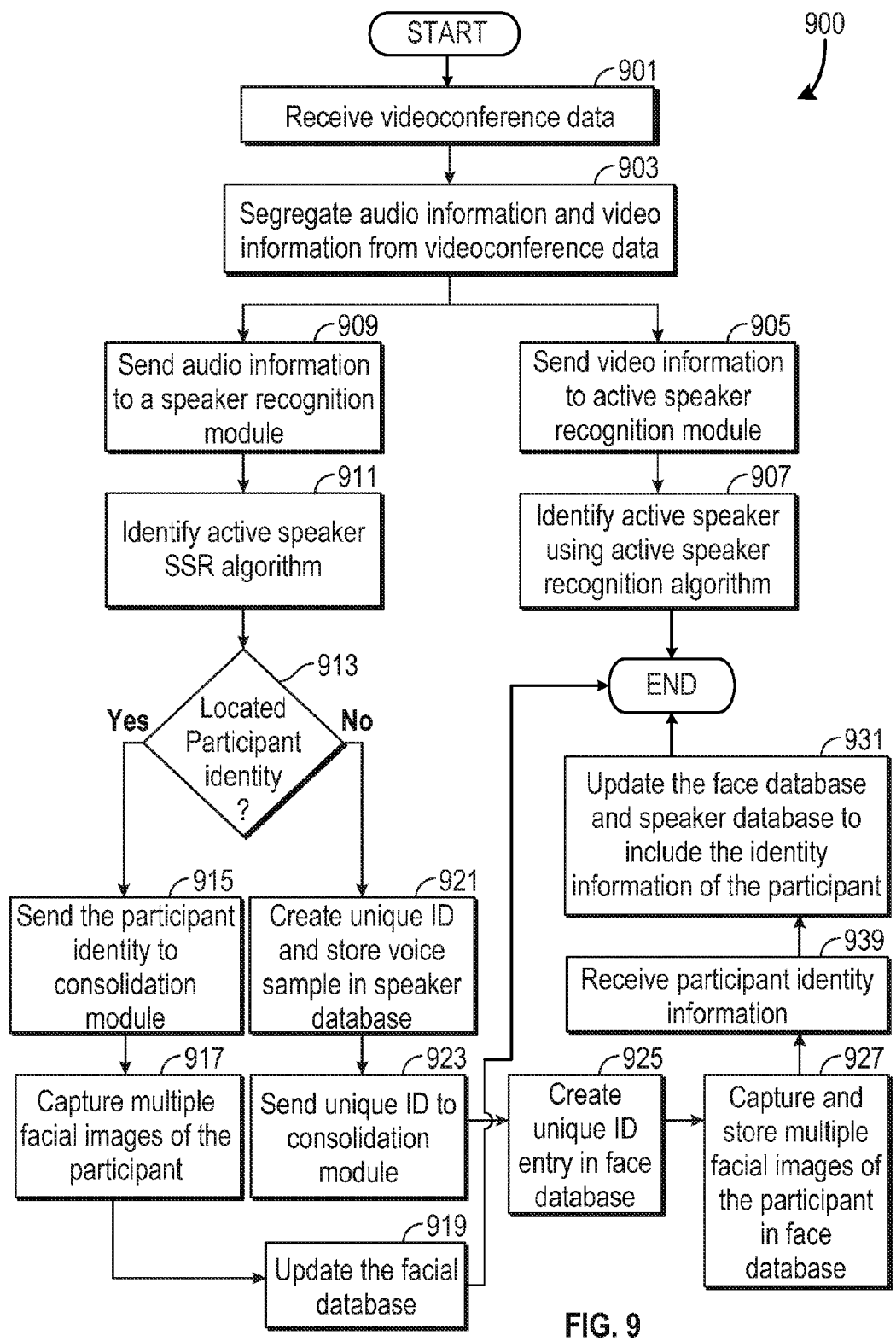
FIG. 9 is a flowchart illustrating method for creating and updating a database to store participant information.

FIG. 9 illustrates a method 900 for creating and updating database 190 using system 800. At block 901 of FIG. 9, the videoconference data may be received at a local endpoint of the videoconference system from a remote endpoint. The videoconference data may be received on a frame by frame basis. For example, the videoconference data may be received as data packets. The data packets may include audio data packets containing audio information, video data packets containing video information, text data packets containing textual information, etc.

The received videoconference data may be processed at block 903 to segregate the audio information and the video information. The videoconference data may be processed by video/audio video splitter module 802. Video/audio splitter module 802 may be configured to separate video information and audio information for a data frame of the videoconference data. In some embodiments, video/audio splitter module 802 may be a multiplexer device configured to separate the video information and the audio information for the frame. In some other embodiments, video/audio splitter module 802 may be a software application configured to separate the video information and the audio information from the videoconference data. Video/audio splitter module 802 may be located at the local endpoint and configured to generate a unique frame number for the each data frame processed.

At block 905, the video information segregated from the videoconference data by video audio splitter module 802 may be sent to active speaker recognition module 808. At block 907, an active speaker in the video information may be identified by active speaker recognition module 808. As an example, active speaker recognition module 808 may be configured to recognize a participant in the video conference who seems to be speaking in audio information, also referred to as an active speaker. Active speaker recognition module 808 may be a software application configured to process the audio information to identify the active speaker.

At block 909, the audio information segregated by video/audio module 802 may be sent to speaker recognition module 804. The audio information may be sent to the speaker recognition module 804 by the video/audio splitter module 802. Speaker recognition module 804 may be configured to process the received audio information. As an example, speaker recognition module 804 may be a software application configured to process the audio information.

An active speaker may be identified, at block 911, in the audio information based on the processing of the audio information. For example, speaker recognition module 804 may be configured to process the audio information to recognize a participant associated with the audio information and provide a speaker label for the audio information. Speaker recognition module 804 may include an algorithm to recognize the active speaker by analyzing attributes of the participants. For example, speaker recognition module 804 may be configured to process the audio information to recognize the participant associated with the audio information, and provide a speaker label for the participant. Speaker recognition module 804 may process the received audio information using audio processing algorithms, such as speaker segmentation and recognition (SSR) algorithm. The SSR algorithm may perform feature extraction and speaker segmentation on the audio information. An output of the SSR algorithm may include speaker homogenous segments (voice models) labeled with "SSR Speakers" or speaker IDs.

At block 913, participant identity corresponding to the speaker ID may be determined. The participant may be identified by speaker recognition module 804 by performing a lookup operation in speaker database 806. Speaker recognition module 804 may have an access to speaker database 806. Speaker database 806 may be a database which includes user provided labels for existing SSR speakers or speaker IDs. As an example, speaker database 806 may include a name corresponding to the voice models or speaker IDs.

Speaker recognition module 804, at block 915, may be configured to send the participant identity from the audio information to consolidation module 810. Consolidation module 810, at block 917, may capture a plurality of facial snapshots of the identified participant. As an example, consolidation module 810 may capture a plurality of facial images of the participant from the video information. As another example, consolidation module 810 may capture facial snapshots of the participant, which may include facial snapshots in multiple poses, multiple expressions, and multiple illumination conditions.

At block 919, consolidation module 810 may update face database 810 to include the captured facial snapshots for the identified participant. As an example, consolidation module 810 may update the facial images of the identified participant stored in facial database 810. The update may include replacing an older facial image with the latest facial image, storing facial images with different camera angle with respect to face of the participant, storing facial images captured in different illumination conditions, etc.

If the lookup operation on speaker database 806 does not provide a name corresponding to the participant identified in the audio information, speaker recognition module 804, at block 921, may create a unique id for the voice model extracted from the audio information. Speaker recognition module 804, at block 921, may create an entry for the extracted voice model from the audio information, in speaker database 806. Speaker recognition module 804 may store the extracted voice model from the audio information in the created entry with the unique ID.

Speaker recognition module 804, at block 923, may send the unique ID created for the extracted voice model to consolidation module 810. Consolidation module 810, at block 925, may create an entry in face database 812 corresponding to the unique ID received from speaker recognition module 804. Consolidation module 810, at block 927 may capture a plurality of facial snapshots corresponding to the unique ID. As an example, consolidation module 810 may capture a plurality of facial images of the participant.

At block 931, consolidation module 810 may receive identity information corresponding to the unique ID. Consolidation module 810 may update face database 810 and speaker database 806 to include the identity information corresponding to the unique ID.

Figure 10:
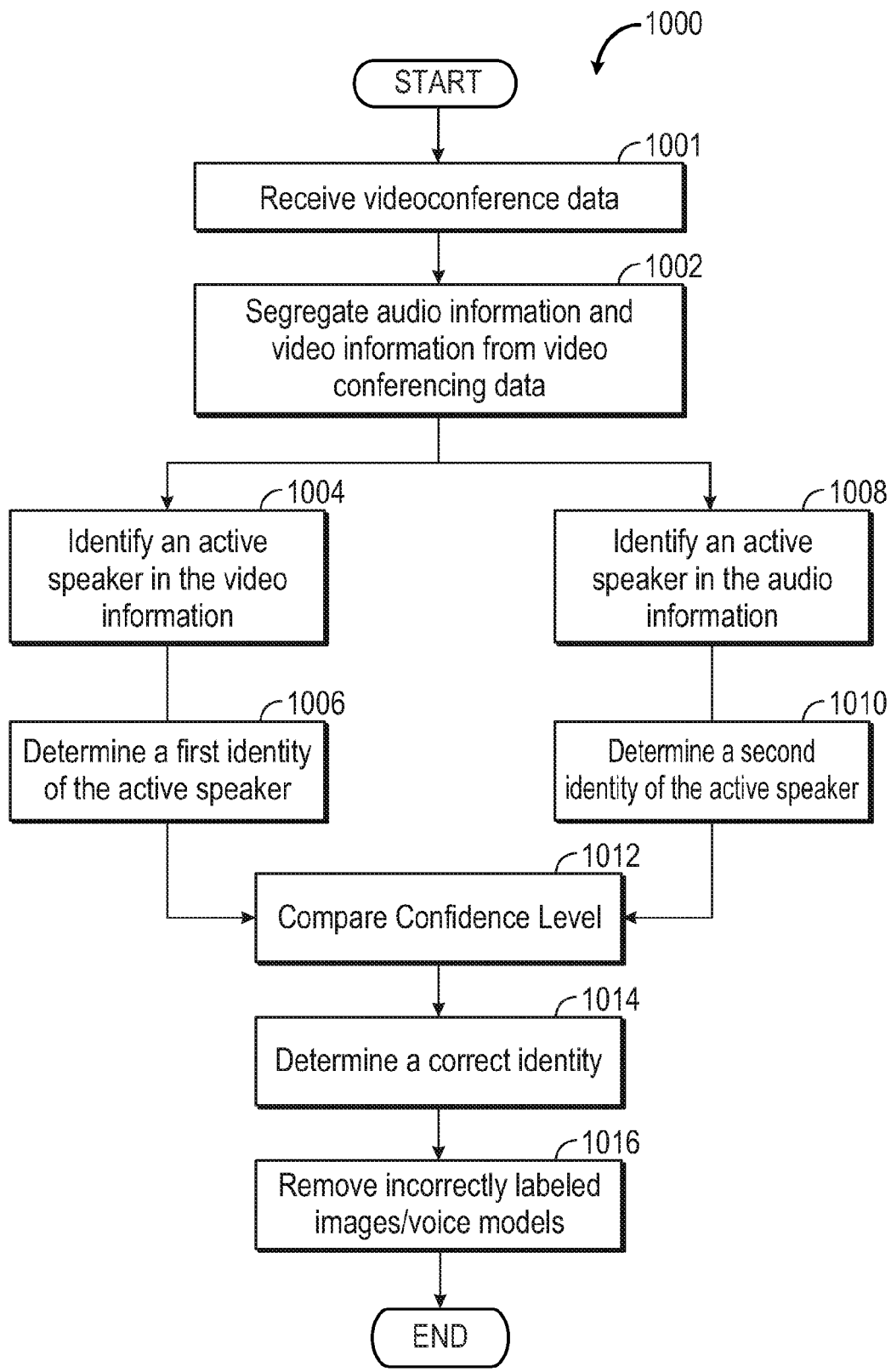
FIG. 10 a flowchart illustrating method to identify participants in a videoconference and update face database and speaker database.

Consistent with embodiments of the disclosure, facial images of the participants stored in face database 810 may constantly be updated. In addition, the facial images stored in face database 810 may constantly be verified to remove incorrectly labeled facial images for the participants. FIG. 10 illustrates a flow diagram illustrating a method 1000 to identify participants of a videoconference and update face database 810 and speaker database 806 based on the identification of the participants to remove incorrectly labeled facial images and voice models for the participants.

At block 1001 of FIG. 10, the videoconference data may be received at an endpoint of the videoconference system. The videoconference data may be received on a frame by frame basis. As an example, the videoconference data may be received as data packets. The data packets may include audio data packets containing audio information, video data packets containing video information, text data packets containing textual information, etc.

At block 1002, the received videoconference data may be processed to segregate the audio information and the video information. The videoconference data may be processed by video/audio video splitter module 802. Video/audio splitter module 802 may be configured to separate video information and audio information for a data frame of the videoconference data.

An active speaker may be identified in the video information segregated from the videoconference data, at block 1004. The active speaker may be identified by active speaker recognition module 808. As an example, the video information segregated from the videoconference data by the video audio splitter module 802 may be sent to active speaker recognition module 808. An active speaker in the video information may be identified by active speaker recognition module 808.

At block 1006, a first identity of the active speaker identified at block 1004 may be determined. The first identity of the active speaker may be determined by active speaker recognition module 808 by performing a lookup operation in face database 810. In addition active speaker recognition module 808 may also determine a confidence level in determination of the first identity. Active speaker recognition module 808 may send the determined first identity and the confidence level to consolidation module 810.

An active speaker may be identified in the audio information segregated from the videoconference data, at block 1008. As an example, the audio information segregated by video/audio module 802 may be sent to speaker recognition module 804. Speaker recognition module 804 may be configured to process the received audio information, and identify an active speaker in the audio information. The active speaker may be identified based on the processing of the audio information and using SSR algorithm.

At block 1010, a second identity of the active speaker identified at block 1006 may be determined. The second identity of the active speaker may be determined by speaker recognition module 804 by performing a lookup operation in speaker database 806. In addition speaker recognition module 804 may also determine a confidence level in determination of the second identity. Speaker recognition module 804 may send the determined second identity and the confidence level to consolidation module 810.

The confidence levels may be compared at block 1012. As an example, the confidence level associated with the first identity may be compared with the confidence level associated with the second identity. The comparison may be performed by consolidation module 810. As an example, consolidation module 810 may receive the first identity of the active speaker from active speaker recognition module 808 along with a confidence level associated with the identification of the active speaker and the first identity. Similarity, consolidation module 810 may receive the second identity of the active speaker from speaker recognition module 806 along with a confidence level associated with the identification of the active speaker and the second identity.

Consistent with embodiments of the disclosure, since the audio information and the video information received at speaker segmentation module 804 and active speaker recognition module 808 respectively, are from the same data frame of the videoconference data, the output from speaker segmentation module 804 and active speaker recognition module 808 may point to the same participant. In another words, the second identity provided by speaker segmentation module 804 may be must be same as the second identity provided by active speaker recognition module 808.

At block 1014, a correct identity of the active speaker in the data frame of the videoconference data may be determined based on the comparison at block 1012. As an example, if the first identity is same as second identity, the correct identity of the active speaker may be identified as either the first identity or the second identity. If the first identity is different from the second identity, a correct identity of the active speaker may be determined based on the confidence levels associated with the first identity and the second identity. As an example, consolidation module 810 may compare the confidence level associated with the first identity provided by active speaker segmentation module 808 with the confidence level associated with the second identity provided by speaker recognition module 804. The comparison may include determine which of the first identity and the second identity has a higher confidence level. As an example, if the confidence level associated with the first identity is higher than the confidence level associated with the second identity, then the first identity may be decided to be a correct identity. Vice versa, if the confidence level associated with the second identity is higher than the confidence level associated with the first identity, then the second identity may be decided to be a correct identity.

Figure 11:
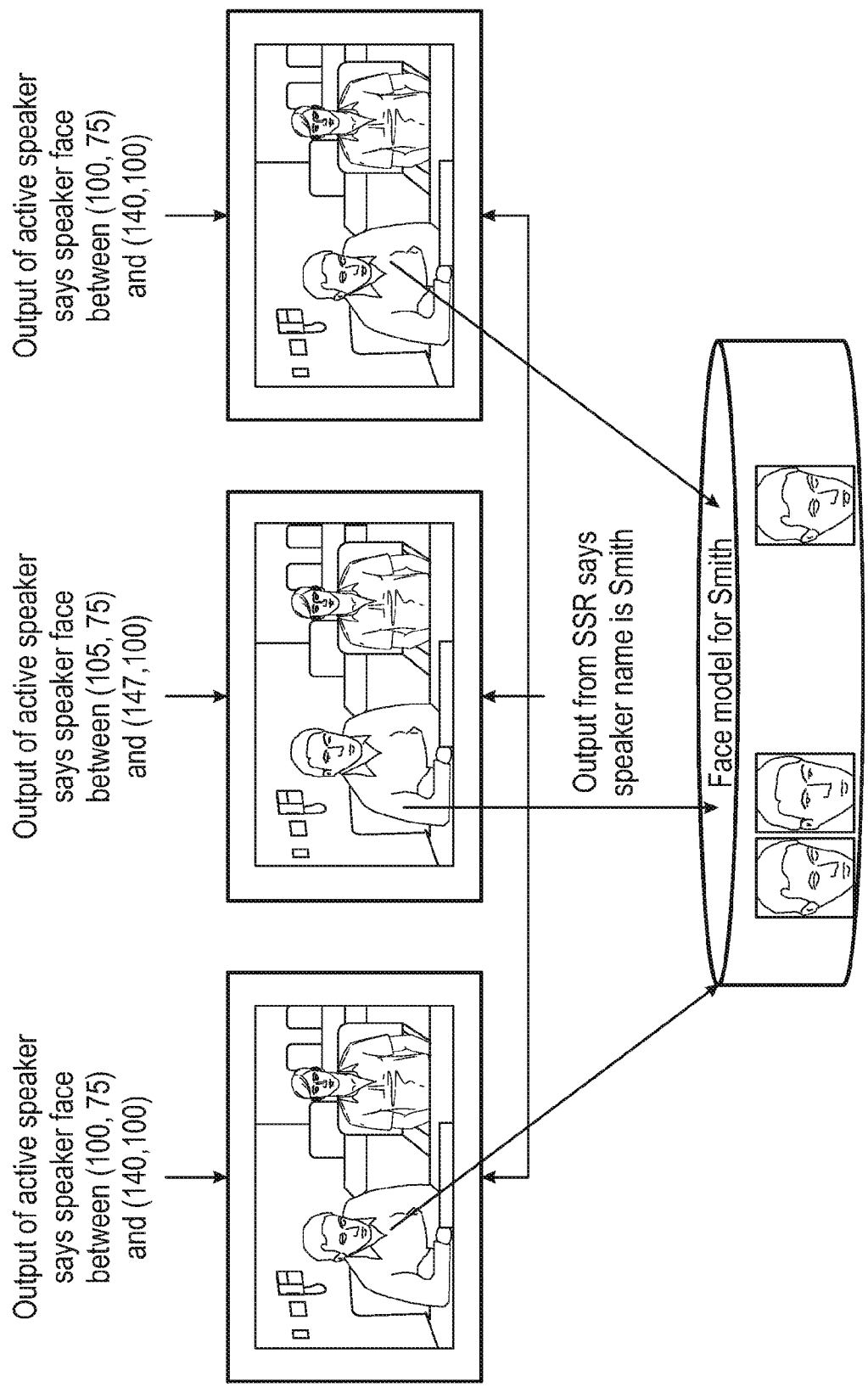
FIGS. 11-12 show a comparison of confidence level associated with active speaker determination from audio information and video information.
Figure 12:
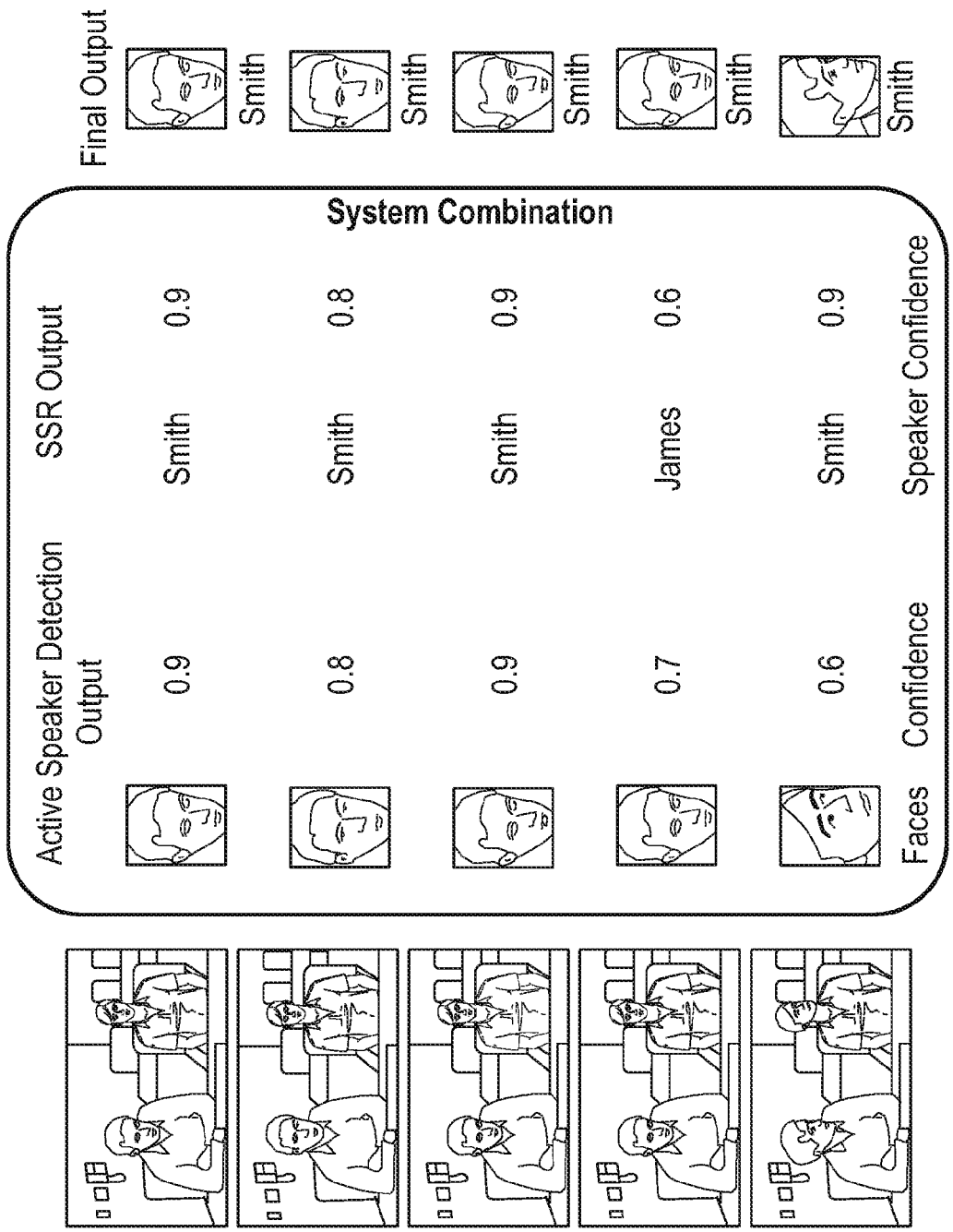

At block 1016, based on the determination of the correct identity at block 1014, incorrectly labeled facial images from the face database, or incorrectly labeled voice models from speaker database may be removed. As an example, consolidation module 810 may remove the incorrectly level facial images of the participant from facial database 812 if the second identity is determined as correct identity. As another example, consolidation module 810 may remove incorrectly labeled voice samples for the participant in speaker database 806 if the first identity is determined as correct identity. FIG. 11 and FIG. 12 show a comparison of confidence level associated with active speaker determination from audio information and video information.

In one embodiment, an administrator of face database 812 and speaker database 806 may supervise and control the addition and deletion of the facial models and the voice models in face database 812 and speaker database 806 respectively. Moreover the administrator may further supervise and modify the identification information of the participants stored in speaker database 806 and face database 812.

The methods of FIG. 9 and FIG. 10 may be implemented by software executing on various kinds of systems. In some embodiments, the methods may be implemented by software executing on a videoconferencing device 120. In some embodiments, the methods may be implemented by software executing on a computer system other than a videoconferencing device 120.

Consistent with embodiments of the disclosure the participant information for the participant may include information such as the participant's name, telephone number, email address, job title, employer, etc. In some embodiments, the participant information for the participants may be received in response to user input manually specifying the participant information, e.g., via a keyboard or other input device. In some embodiments, the participant information for the participant may be received in other ways (e.g., from another program or database). In one embodiment, the participant information may be received from a pre-stored database. For example, the participant information may be received from a pre-stored database for each person who works for an organization.

Consistent with embodiments of the disclosure, face recognition module 814 may be configured to provide identity of the participants and their locations within video image in the videoconference based on facial recognition techniques. Face recognition module 814 may be configured to analyze the video image to determine one or more regions within the video image where a participant's face is located and may analyze each face to identify the participant by performing a lookup operation in face database 812. As an example, face recognition module 814 may obtain the participant information for the participants whose faces appear within the video image by searching face database 812 to find records whose facial information matches the faces in the video image.

Figure 13:
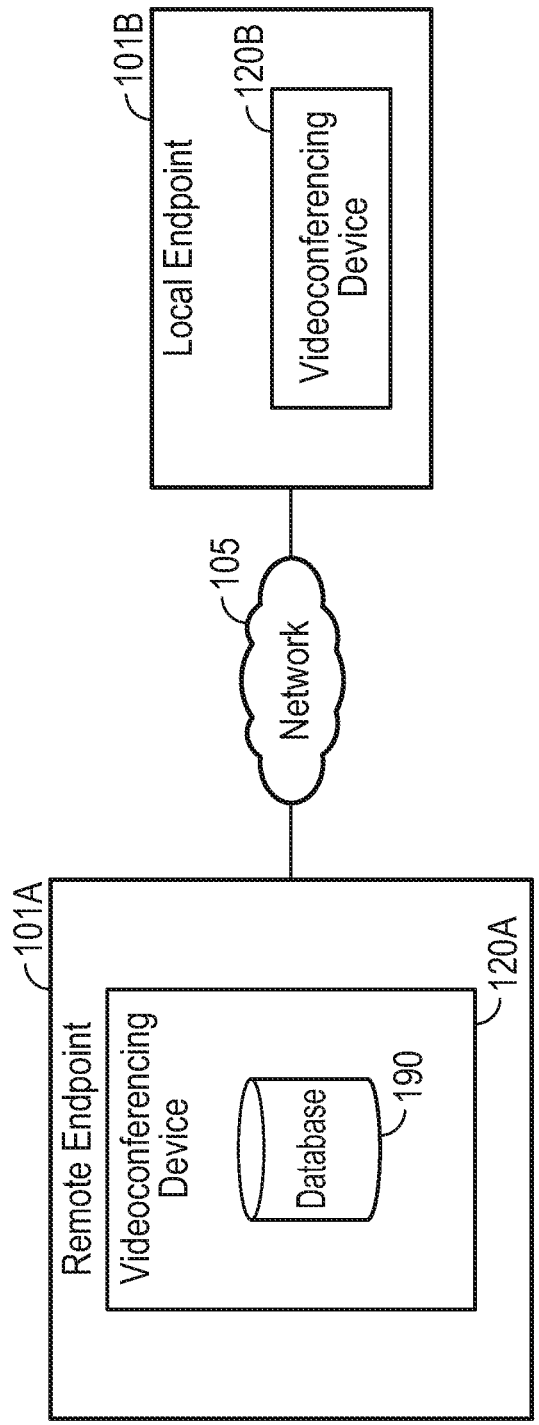
FIGS. 13-15 illustrate databases in which participant information for participants may be stored.
Figure 14:
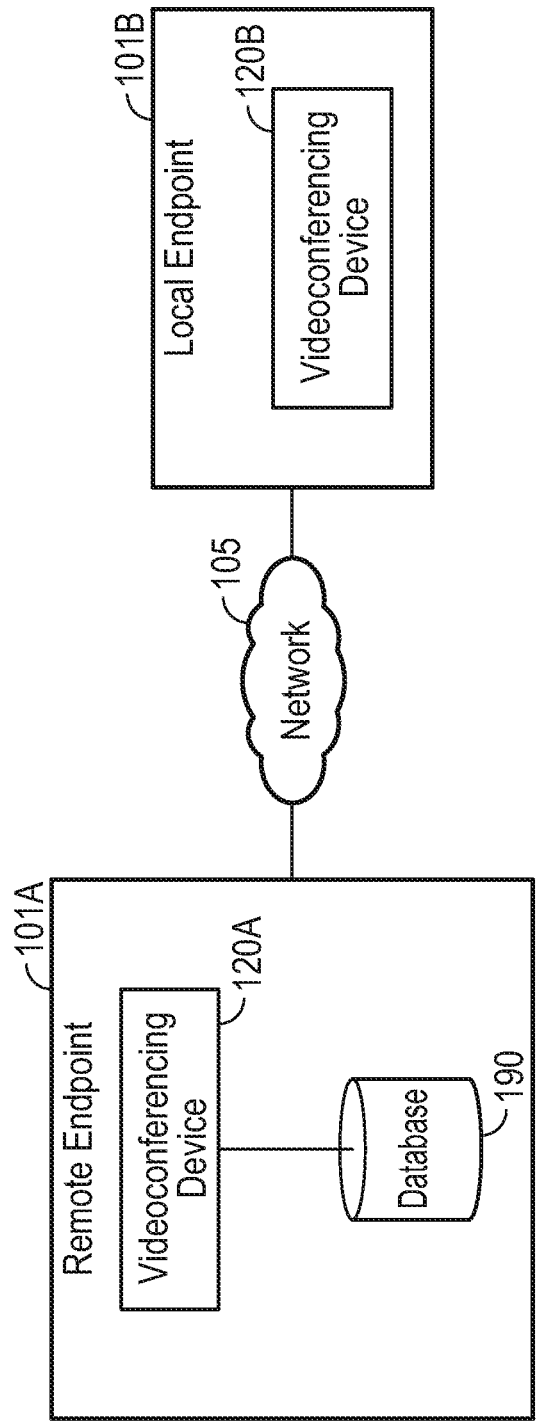
Figure 15:
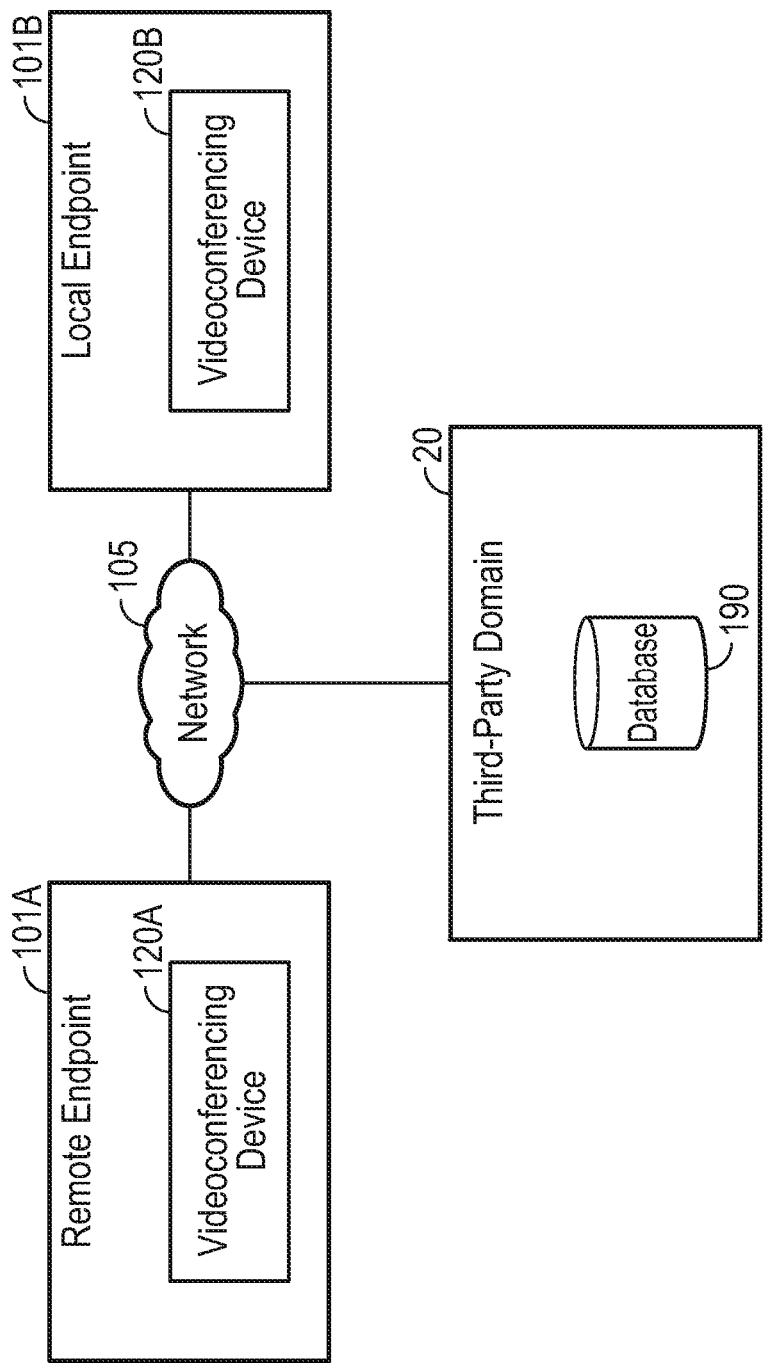

FIGS. 13-15 illustrate several implementations of database 190 in which participant information for participants are stored. As seen in FIG. 13, database 190 may be stored on or included in the videoconferencing device 120A at remote endpoint 101A. For example, database 190 may be stored on a hard disk or other memory medium of video conferencing device 120A. Videoconferencing device 120A may execute software operable to receive participant information and identity information for each of a plurality of people associated with the remote endpoint 101A. Videoconferencing device 120 may also store a respective record for each person in database 190. The record for each person may link the person's identity information to his participant information.

FIG. 14 illustrates an embodiment of database 190 that may be associated with remote endpoint 101A, but is not stored on or included in videoconferencing device 120A itself. For example, database 190 may be stored on a computer system coupled to a local area network (LAN) at remote endpoint 101A, where videoconferencing device 120A is also coupled to the LAN. In some embodiments, the computer system may execute software operable to receive participant information and identity information and store the participant information for each person in database 190 in association with the person's identity information. When a videoconference is held at a subsequent time, videoconferencing device 120A may communicate with the computer system to retrieve participant information for videoconference participants from the database 190.

FIG. 15 illustrates an embodiment of database 190 stored on a computer system or in a domain not associated with the remote endpoint 101A. Database 190 may instead be hosted by a server computer associated with, for example, a trusted third-party domain. For example, in some embodiments, database 190 may be hosted by a vendor of videoconferencing devices 120A and 120B or may be hosted by a third-party service provider for videoconferencing devices 120A and 120B. Videoconferencing device 120A or another computer system at remote endpoint 101A may communicate with the server computer in the trusted third-party domain to store participant information and associated identity information for various people (e.g., employees) associated with remote endpoint 101A in database 190.

In some embodiments, similar to database 190, other components of system 800 may be configured on or included in videoconferencing device 120A at remote endpoint 101A; associated with remote endpoint 101A, but is not stored on or included in videoconferencing device 120A itself; and stored on a computer system or in a domain not associated with remote endpoint 101A.

Facial recognition may also be used to dynamically change or move the displayed participant information as the video image changes. For example, participants may walk or move across the video frame. The local videoconferencing device may operate to track the participants' faces as they move across the video frame and may update the display of the participant information accordingly. For example, if a participant moves from one side of the scene to the other then his participant information may be moved to maintain proximity with the participant. If a participant disappears out of the scene then his participant information may be removed from the display screen. If a new participant appears in the scene then participant information for the new participant may be displayed.

In some embodiments, the remote videoconferencing device at the remote endpoint may perform facial recognition techniques instead of the local videoconferencing device at the local endpoint. For example, the remote videoconferencing device may perform facial recognition techniques. Before sending the video image to the local videoconferencing device, the remote videoconferencing device may alter the video image so that participant information is displayed proximally to the participants.

In some embodiments, methods and systems described herein may provide an automatic mechanism to collect real life facial images from a speaker and associate a name to the facial images. The collected facial images may enable a three dimensional (3D) modeling of the face of the participant. The collected facial images may further improve face recognition algorithm performance in no-ideal illumination and camera settings.

In some embodiments, methods and systems described herein may provide a technique to bootstrap/enhance face models for different speakers to be used for facial recognition. As an example, if a speaker has a voice model in the database 120, and when speaker recognition module 804 provides an identity information, active speaker recognition module 808 may be used to identify the speaker in the video information and start collecting facial images of the speaker to build a face model for the speaker.

Similarly, methods and systems described herein may provide an automatic mechanism to collect real life voice models from a speaker and associate a name to the voice models. Moreover, methods and systems described herein, may be used to create a database of voice models (if not provided), update a voice model, and enhance a performance of SSR algorithms.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   identifying a participant from audio information, wherein identifying the participant from the audio information comprises:

performing a feature extraction and a speaker segmentation on the audio information to determine a voice model, and
comparing the determined voice model from the audio information with a plurality of voice models stored in a database to identify the participant;
identifying the participant in video information, wherein identifying the participant in the video information comprises:
identifying a plurality of facial images in the video information;
determining a one of the plurality of facial images in the video information as having the most movement as compared to others of the plurality of facial images; and
identifying the participant as the determined one of the plurality of facial images;
capturing, from the video information, a plurality of images of the participant identified in the video information wherein ones of the plurality of captured images of the participant include respective different expressions of a face of the participant and wherein other ones of the plurality of captured images of the participant include respective different illumination conditions of the face of the participant;
associating a unique identifier with the captured plurality of images, the unique identifier corresponding to the participant identified from the audio information; and
saving the captured plurality of images and the associated unique identifier in the database.

2. The method of claim 1, wherein identifying the participant from the audio information comprises providing the unique identifier corresponding to a stored voice model when the determined voice model from the audio information matches the stored voice model.

3. The method of claim 1, wherein identifying the participant from the audio information comprises providing the unique identifier corresponding to a stored voice model when the determined voice model from the audio information matches the stored voice model, the unique identifier comprising a name of the identified participant.

4. The method of claim 1, wherein identifying the participant from the audio information comprises performing a speaker segmentation and recognition (SSR) algorithm on the audio information to identify the participant from the audio information.

5. The method of claim 1, wherein identifying the participant in video information comprises performing an active speaker detection (ASD) algorithm on the video information to identify the participant in the video information.

6. The method of claim 1, wherein capturing the plurality of images comprises capturing the plurality of images wherein ones of the plurality of images are at respective different angles with respect to a position of a face of the participant.

7. The method of claim 1, wherein capturing the plurality of images comprises capturing the plurality of images wherein ones of the plurality of images include respective different poses of a face of the participant.

8. The method of claim 1, wherein capturing the plurality of images comprises capturing the plurality of images wherein ones of the plurality of images include respective different expressions of a face of the participant.

9. The method of claim 1, wherein capturing the plurality of images comprises capturing the plurality of images wherein ones of the plurality of images include respective different illumination conditions of a face of the participant.

10. The method of claim 1, wherein associating the unique identifier with the captured plurality of images comprises associating the unique identifier comprising a name of the participant.

11. The method of claim 1, further comprising receiving the audio information.

12. The method of claim 11, wherein receiving the audio information comprises receiving the audio information from a videoconference.

13. The method of claim 1, further comprising receiving the video information.

14. The method of claim 13, wherein receiving the video information comprises receiving the video information from a videoconference.

15. The method of claim 1, further comprising:
receiving the audio information from a teleconference; and
receiving the video information from the teleconference.

16. The method of claim 1, further comprising removing a one of the captured plurality of images from the captured plurality of images when a combined confidence level of the identified participant from the audio information and the video information associated with the one of the captured plurality of images is below a predefined threshold.

17. An apparatus comprising:
a memory storage; and
a processing unit coupled to the memory storage, wherein the processing unit is operative to:
identify a participant from video information in a teleconference, wherein the processing unit being operative to identify the participant in the video information comprises the processing unit being operative to:
identify a plurality of facial images in the video information,
determine a one of the plurality of facial images in the video information as having the most movement as compared to others of the plurality of facial images, and
identify the participant as the determined one of the plurality of facial images;
capture, from the video information in the teleconference, a plurality of images of the participant identified in the video information wherein ones of the plurality of captured images of the participant include respective different expressions of a face of the participant and wherein other ones of the plurality of captured images of the participant include respective different illumination conditions of the face of the participant;
associate a unique identifier with the captured plurality of images, the unique identifier corresponding to the participant identified from audio information in the teleconference, wherein the processing unit being operative to associate the unique identifier comprises the processing unit being operative to:
perform a feature extraction and a speaker segmentation on the audio information to determine a voice model, and
compare the determined voice model from the audio information with a plurality of voice models stored in a database to identify the participant;
receive participant information corresponding to the unique identifier; and
save the captured plurality of images and the associated participant information in a database.

18. The apparatus of claim 17, wherein the processing unit being operative to receive the participant information comprises the processing unit being operative to receive the participant information comprising at least one of the following:

a name of the participant; a phone number of the participant; an email address of the participant; a business address of the participant; a job title of the participant; and an employer of the participant.

19. The apparatus of claim 17, wherein the processing unit being operative to capture the plurality of images comprises the processing unit being operative to capture the plurality of images wherein ones of the plurality of images are at respective different angles with respect to a position of the face of the participant.

20. The apparatus of claim 17, wherein the processing unit being operative to capture the plurality of images comprises the processing unit being operative to capture the plurality of images wherein ones of the plurality of images include respective different poses of the face of the participant.

21. A non-transitory computer-readable medium that stores a set of instructions which when executed perform a method comprising:
- identifying a participant in video information, wherein identifying the participant in the video information comprises:
  - identifying a plurality of facial images in the video information;
  - determining a one of the plurality of facial images in the video information as having the most movement as compared to others of the plurality of facial images; and
  - identifying the participant as the determined one of the plurality of facial images;
- capturing, from the video information, a plurality of images of the participant identified in the video information wherein ones of the plurality of captured images of the participant include respective different expressions of a face of the participant and wherein other ones of the plurality of captured images of the participant include respective different illumination conditions of the face of the participant;
- associating a unique identifier with the captured plurality of images, the unique identifier corresponding to the participant identified from audio information, wherein associating the unique identifier with the captured plurality of images comprises:
  - performing a feature extraction and a speaker segmentation on the audio information to determine a voice model, and
  - comparing the determined voice model from the audio information with a plurality of voice models stored in a database to identify the participant; and
- saving the captured plurality of images and the associated unique identifier in the database.

22. The non-transitory computer-readable medium of claim 21, further comprising removing a one of the captured plurality of images from the captured plurality of images when a combined confidence level of the identified participant from the audio information and the video information associated with the one of the captured plurality of images is below a predefined threshold.

23. The non-transitory computer-readable medium of claim 21, further comprising using the database to identify the participant.

* * * * *